(12) United States Patent
Gross et al.

(10) Patent No.: US 7,545,531 B2
(45) Date of Patent: Jun. 9, 2009

(54) METHOD AND APPARATUS FOR IMPLEMENTING STATISTICAL PROCESS CONTROL (SPC) IN A PRINTING ENVIRONMENT

(75) Inventors: Eric M. Gross, Rochester, NY (US); Joseph A. Mastrandrea, Webster, NY (US); James M. Pacer, Webster, NY (US); David R. Stookey, Rochester, NY (US); Soon K. Kuek, Fairport, NY (US); Eric S. Hamby, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 918 days.

(21) Appl. No.: 10/847,933

(22) Filed: May 18, 2004

(65) Prior Publication Data

US 2008/0170245 A1 Jul. 17, 2008

(51) Int. Cl.
*H04N 1/60* (2006.01)
*G06F 15/00* (2006.01)
*G06K 1/00* (2006.01)

(52) U.S. Cl. .................................... 358/1.5; 358/1.9
(58) Field of Classification Search ............... 358/2.1, 358/504, 1.5, 1.9, 1.15, 1.16, 1.17; 399/49, 399/58; 355/14
See application file for complete search history.

(56) References Cited

U.S. PATENT DOCUMENTS

| | | | | |
|---|---|---|---|---|
| 3,151,237 A | * | 9/1964 | Hrabak | 702/81 |
| 4,062,061 A | * | 12/1977 | Batchelor et al. | 714/47 |
| 4,785,329 A | * | 11/1988 | Walsh | 399/11 |
| 5,053,815 A | | 10/1991 | Wendell | |
| 5,257,206 A | | 10/1993 | Hanson | |
| 5,392,226 A | | 2/1995 | Hamilton | |
| 5,862,054 A | | 1/1999 | Li | |
| 6,119,047 A | | 9/2000 | Eryurek et al. | |
| 6,442,499 B1 | | 8/2002 | Gorin | |
| 6,445,969 B1 | | 9/2002 | Kenney et al. | |
| 6,496,958 B1 | | 12/2002 | Ott et al. | |
| 6,556,884 B1 | | 4/2003 | Miller et al. | |
| 6,832,550 B2 | * | 12/2004 | Martin et al. | 101/349.1 |
| 7,239,427 B2 | * | 7/2007 | Tezuka et al. | 358/2.1 |
| 2004/0028421 A1 | * | 2/2004 | Shiratori | 399/49 |

FOREIGN PATENT DOCUMENTS

WO WO 2004/013715 A1 2/2004

OTHER PUBLICATIONS

European Search Report.

* cited by examiner

*Primary Examiner*—King Y Poon
*Assistant Examiner*—Allen H Nguyen
(74) *Attorney, Agent, or Firm*—Fay Sharpe LLP

(57) ABSTRACT

A method and apparatus for implementing statistical process control (SPC) in a printing environment to address errant reads of control sensors is provided. The system uses SPC, in systems having feedback control based on control sensor data, to identify errant reads and ensure that such errant reads are not used in the applicable feedback loop. Unnecessary reaction to the errant reads is thus avoided.

19 Claims, 4 Drawing Sheets

METHOD AND APPARATUS FOR IMPLEMENTING STATISTICAL PROCESS CONTROL (SPC) IN A PRINTING ENVIRONMENT

BACKGROUND

The present exemplary embodiment relates to a method and system for implementing statistical process control (SPC) in a printing environment. It finds particular application in conjunction with print engines, and will be described with particular reference thereto. However, it is to be appreciated that the present exemplary embodiment is also amenable to other like applications.

By way of background, more sophisticated printing processes typically include process control sensors that accomplish a variety of tasks. As an example, process control sensors are typically positioned within a print engine of a printer to detect printed color. The printing system uses the data from the sensors to implement adjustments to the print engine to accommodate for errors or undesired variations in the printed color. This provides a useful feedback system that enhances the quality of the printing process.

At times, however, the process control sensor data may be in error and not representative of the true attribute being measured. This could occur for a variety of reasons, including an errant read. If the erroneous process control sensor reads are not identified as such, then actuator adjustments are made in response to the false reads. This unnecessarily induces color instability which leads to customer dissatisfaction.

As an example, a periodic "spike" in a tone reproduction curve sensor may induce a color shift in the printing process. The "spike" may merely be the result of a short-lived system problem such as electrical noise, as opposed to actual problems with the printed color. This undesired color shift will likely produce prints that truly are in error. Of course, these erroneous prints will then result in further unnecessary color shifting as a result of the process control sensor reads. It would be desirable to have error corrections made in the system only where necessary, i.e., where actual undesired color variations exist—and not as the result of an errant sensor read.

In addition, the notion of real time SPC (statistical process control) is extremely effective in determining process capability for a variety of industrial applications. It determines whether the process under analysis is stable and, if so, then determines the mean and variance of the process. If the process lacks stability, this is also typically detected. The lack of stability may indicate the presence of a problem, allowing for the commencement of a process by which a root cause may be pursued. If the process is stable, the estimates of the process mean and variation may still indicate a problem and also initiate a process by which the root cause can be pursued and eliminated, or if the estimates of the process mean and variation represent a system limitation, the system itself can be redesigned.

Real time SPC can be a strong pillar of any system of diagnosis, debugging, and/or process improvement for a manufacturing process. However, while SPC is capable of identifying the existence of a problem, it is limited in identifying root causes of problems. More intelligence in the system is necessary to do so. For example, in a printing environment, analyzing the frequency domain properties of a sensor signal may indicate an impending bearing failure. This type of intelligence would typically be used to supplement a conventional statistical process control (SPC) technique to allow for identification of such a root cause.

U.S. Pat. No. 5,053,815 (the '815 patent) relates to a reproduction apparatus having real time statistical process control. However, this patent teaches the concept of making comparisons to predetermine control limit reference values, as opposed to real time data streams indicative of whether a process is in stable control and/or, if it is in control, then determining the mean and degree of variation in the process. Moreover, the '815 patent does not disclose a technique for addressing errant reads of sensors. Indeed, it appears that errant sensor reads would simply be used in the process disclosed to predict incipient problems before failure occurs.

BRIEF DESCRIPTION

In accordance with one aspect of the present exemplary embodiment, the method comprises receiving data read by process control sensors in the print engine, identifying subgroups within the data, determining ranges of each of the subgroups, calculating an average range based on the determined ranges, estimating a natural process variation based on the average range, calculating a control limit based on the natural process variation, comparing a selected subgroup range to the control limit (determining if the process is or is not in control), then identifying the data that exceeds the control limit as errant data, and filtering out the errant data from the feedback path.

In accordance with another aspect of the present exemplary embodiment, the process control sensors are operative to detect color.

In accordance with another aspect of the present exemplary embodiment, the controlling of the print engine comprises initiating color shifts.

In accordance with another aspect of the present exemplary embodiment, the identifying of subgroups comprises identifying subgroups of a fixed number of data points In accordance with another aspect of the present exemplary embodiment, the estimating of the natural process variation comprises estimating a standard deviation.

In accordance with another aspect of the present exemplary embodiment, the calculating of the control limit comprises multiplying the standard deviation by a factor of approximately three.

In accordance with another aspect of the present exemplary embodiment, the filtering out of errant data comprises selectively activating a control unit on the feedback path to block the errant data from feedback to the print engine.

In accordance with another aspect of the present exemplary embodiment, the method further comprises storing the errant data.

In accordance with another aspect of the present exemplary embodiment, the method comprises performing a diagnostics process based on the errant data.

In accordance with another aspect of the present exemplary embodiment, the method further comprises performing a redesign of the print engine based on the errant data, and the estimated control limits that represent the mean and standard deviation of the process.

In accordance with another aspect of the present exemplary embodiment, a means is provided for implementing the method of the present exemplary embodiment.

An advantage of the present exemplary embodiment is that it provides a stopgap measure—to identify a potential failure in the event that a failure is developed overtime—without unnecessarily alerting the printing process. With real time SPC, the erroneous sensor read is flagged and ignored, thereby preventing the degradation of customer prints until design changes can be made or a service technician can be called. The frequency of occurrence can also be tracked to determine the extent of the problem.

DETAILED DESCRIPTION

Automated SPC has been used, but this exemplary embodiment adds value by applying SPC within a print engine manufacturing system and establishing the approach as the foundation of a diagnostics, repair, and process improvement strategy. The proven effectiveness of this body of techniques termed SPC applied to the print engine processes provides advantages over that which is known. An example of implementation is described below; however, it should be understood that printing environments may vary and the systems used to implement printing processes are well known to those of skill in the art. Accordingly, only the print engine and associated systems are described herein to describe the present example embodiments. Of course, the presently described embodiments have wide application to the variety of environments noted. Moreover, the print engine described herein may take a variety of forms, including that of a xerographic print engine.

Figure 1:
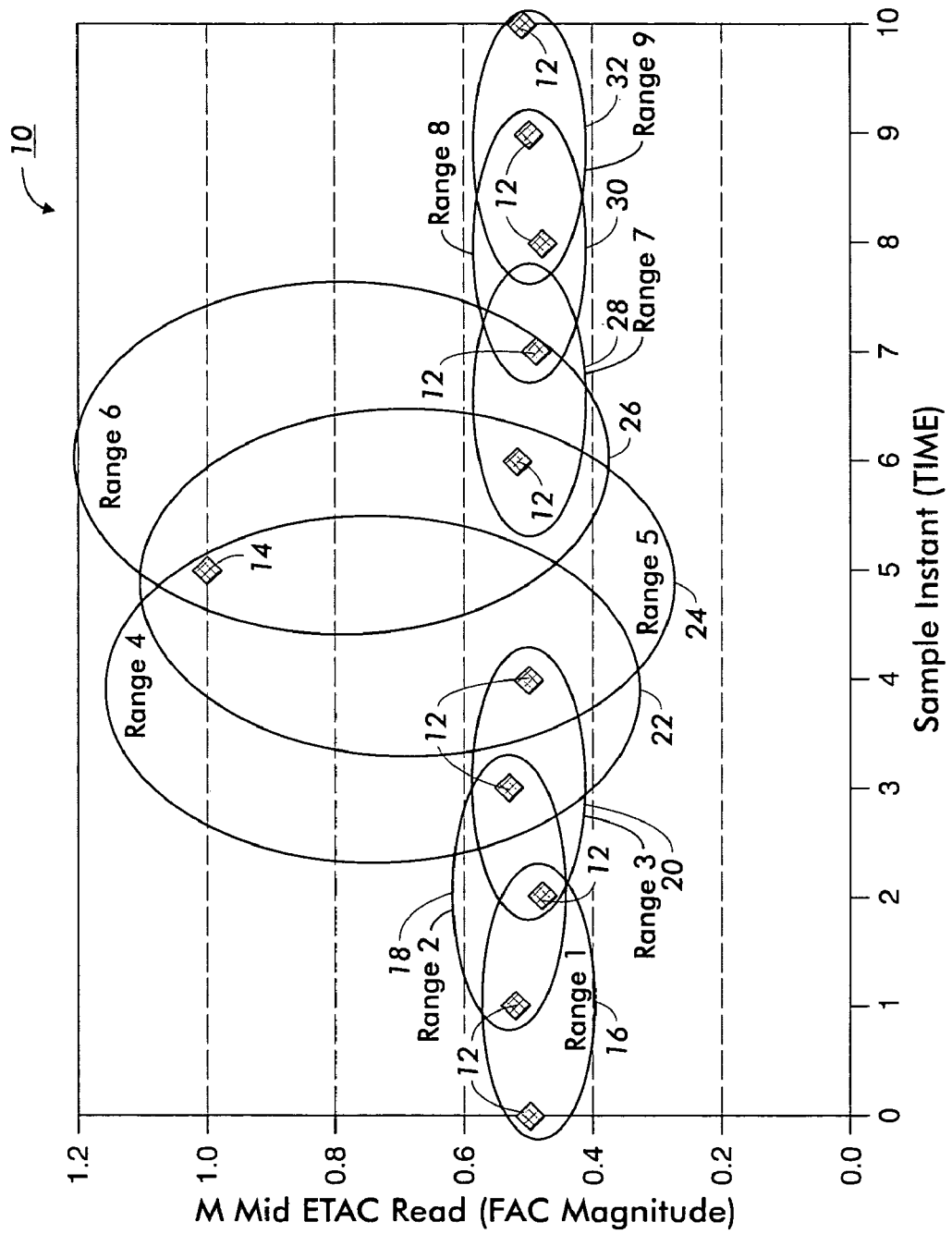
FIG. 1 is a graph illustrating aspects of a method according to the present exemplary embodiment.

With reference to FIG. 1, a plot 10 of an example sensor read sequence (termed M mid ETAC Read (FAC), which represents the sensor reads associated with the magenta mid patch fractional area coverage) vs. Time (one sample instant is ~10 seconds) is shown. The data plotted represents sensor reads from a process control sensor detecting color for the purpose of analysis; however, other types of sensors may be used in conjunction with the presently described embodiments. As shown, all data points 12 fall in a range of 0.4 to 0.6. Data point 14, however, is shown as having a magnitude of approximately 1, significantly higher than the neighboring data points. Data point 14 represents the "spike" referenced above and, in all likelihood, is the result of an errant sensor read. The sensor read may be representative of a problem in the system that is unrelated to color variation such as electrical noise or grounding problems. Also shown in FIG. 1 are subgroups of the data points. These subgroups are used to calculate range values which, as will be described below, are useful in the data analysis. As shown, subgroup 16 relates to a first range, subgroup 18 relates to a second range, subgroup 20 relates to a third range, subgroup 22 relates to a fourth range, subgroup 24 relates to a fifth range, subgroup 26 relates to a sixth range, subgroup 28 relates to an seventh range, subgroup 30 relates to a eighth range and subgroup 32 relates to a ninth range of values.

Figure 2:
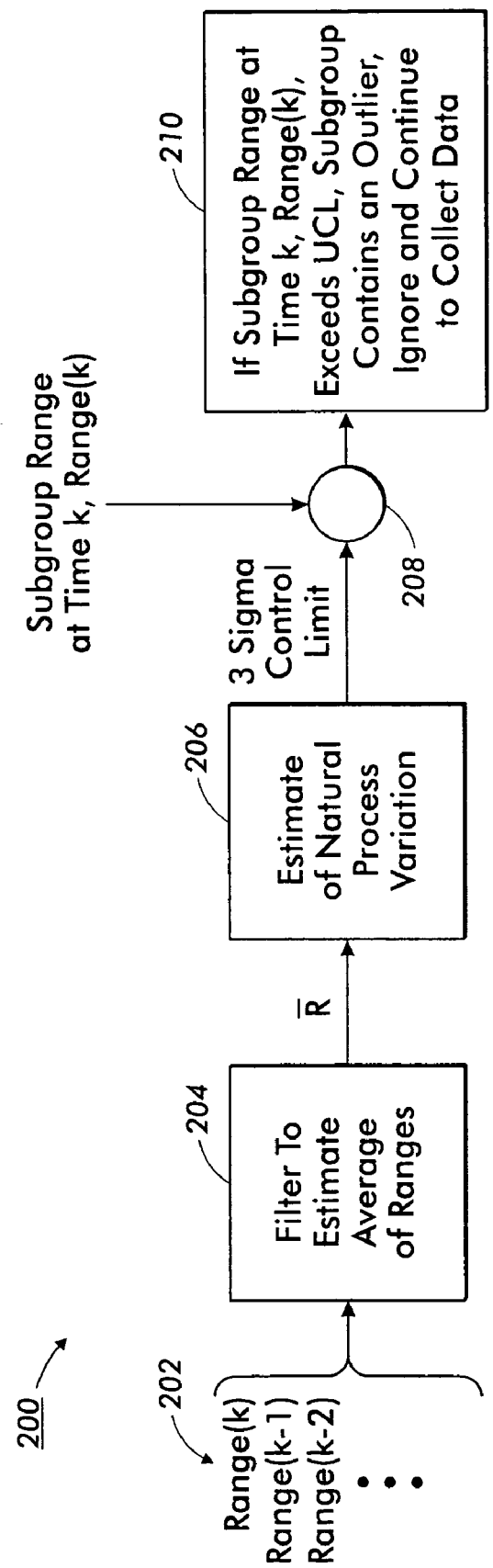
FIG. 2 is a flowchart illustrating a method according to the present exemplary embodiment.

With reference now to FIG. 2, the flow chart represents an online SPC routine 200 that identifies the data outliers, such as data point 14 of FIG. 1, and then operates in an open loop manner until there is confidence that the outliers, or errant data, are no longer occurring. Of course, if the system operates in an open loop manner, then there is no feedback of the erroneous data point 14 to the system. Indeed, as described in connection with FIG. 3, errant data is essentially blocked from being fed back to the print engine that is the subject of the exemplary embodiments described herein. As a result, unnecessary color shifting based on the errant read is avoided.

The data points, in the form of an average range of a subgroup thereof, are collected serially in time. A subgroup size of 2 or 3 can be specified. For example, a subgroup of size may comprise sets of reads of [X1, X2, X3], [X2, X3, X4], [X3, X4, X5], etc. According to the present exemplary embodiment, the range of each subgroup will be computed (at 202). The range is preferably defined as a maximum sensor read minus the minimum sensor read in the subgroup. The computed ranges will then be first order low pass filtered or processed with a moving average filter to obtain an estimate of the average range R bar (at 204). The filtering effect of this averaging can also be viewed as using a forgetting factor, so that ranges far in the past do not influence the current outlier threshold very much—thereby providing the system with a threshold that is adaptive. The degree of filtering can be specified by a single value. In addition, it is assumed that the variation of the process can change over time (over the short term the process is in statistical control but over the long term there is drift). To account for the possibility of gradual drifting, the moving average filter may process the sequence of ranges.

The filtered range will then be scaled to estimate a 3-sigma upper and lower control limit (at 206). The natural process limits e.g., +−3 standard deviation units, are then computed from the filtered ranges. Well known tables exist such that, with knowledge of the sub group size and knowledge of the average range and grand average, natural process limits can be computed. The computation is customarily presented in tabular form for ease of use.

Next, selected subgroup ranges are compared to the control limit (at 208). The sub-group ranges and the natural process limits are updated in real time. Notably, the process limits are not fixed, since they are an outcome of the process, not a prespecified input. If the selected subgroup range exceeds the process limits, then the subgroup range is assumed to be the result of a specific problem in the process and, as such, is classified as an outlier, or errant data. The outlier is noted, and in the exemplary application described here, it is ignored and not fed back to the feedback control system (at 210). Though it is ignored for feedback purposes, the existence of an outlier is recorded and communicated to the design or service community. Ignoring the read but counting the number of such occurrences is a tradeoff between responding to a non representative outlier or going open loop for an additional sample interval.

Preferably, a diagnostic process is performed based on the statistical characteristics of the process. This information is then used by design or service engineers to understand the natural levels of system variation. With knowledge of system variation and specification limits, any of a number of system capability indexes can be computed and relayed automatically to the engineering community. A common index being the capability ratio, Cp=(Upper Specification Limit−Lower Specification)/(6*Standard Deviation Estimate). If the process mean is centered, then the system is capable of 6 sigma performance if Cp is greater than 1. If less then 1 then the system will not perform at a 6 sigma capability.

This exemplary embodiment describes a unique adaptation of the standard IMR (Individual Moving Range) chart for the monitoring of process variation. As in any SPC routine, the subject filter process requires the specification of a sub-group size (e.g., the subgroup size is set at a value of 3 for illustration purposes). It should be understood that setting the subgroup size to greater than 2 can catch successive erroneous reads. With larger subgroup sizes that are smaller than a 3 sigma upper control limit, the algorithm reads in a conservative manner. In this specific case where color stability is critical, it is better to have more false positives (e.g., simply go open loop for a short time) than to miss a real occurrence.

Figure 3:
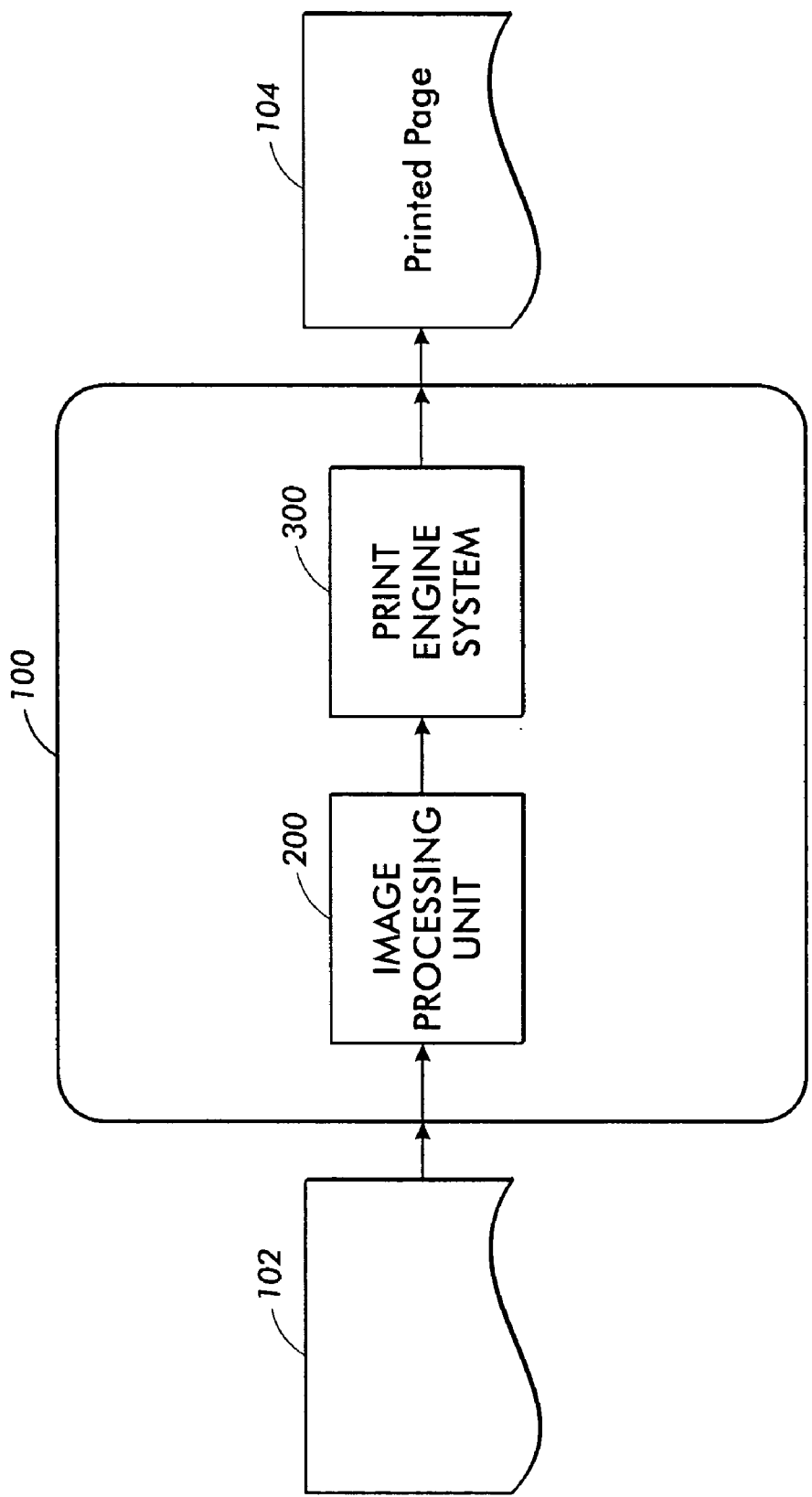
FIG. 3 is a block diagram of an implementation of the present exemplary embodiment.

With reference now to FIG. 3, an exemplary implementation of the present exemplary embodiments will be described. Of course, it should be understood that the teachings herein may be implemented in a variety of ways in a variety of different environments. However, any such implementation preferably includes the feature of detecting potentially erroneous sensor reads and ignoring (for the time being) such reads so as to not disrupt the normal processing of the system.

As shown in FIG. 3, a printing system 100 is illustrated. It should be appreciated that the system 100 is shown in representative fashion and, in implementation, includes a variety of other components that are well known and need not be shown or described herein. However, basic printing system 100 includes an image processing unit 200, or the like, and a print engine system 300. A page or data for a page 102 is input into the system and is ultimately processed by the image processing unit 200. The image is then fed to the print engine system 300 which will be described in more detail in connection with FIG. 4. However, the end result of the printing process is a printed page 104.

It should be appreciated that the printing system 100 is preferably a printer, however, it may take the form of other image rendering devices such as copiers, facsimiles, and the like. Of course, some of these embodiments may require that a scanner be implemented in the system. The image processing unit 200 and the print engine 300 include appropriate software and hardware to accommodate printing and the method and apparatus of the presently described embodiments. Again, these units may take a variety of forms that will be apparent to those of skill in the art upon reading and understanding of the present embodiment. For example, storage devices could be utilized within the system 100 to store the code to implement the presently preferred embodiments.

Figure 4:
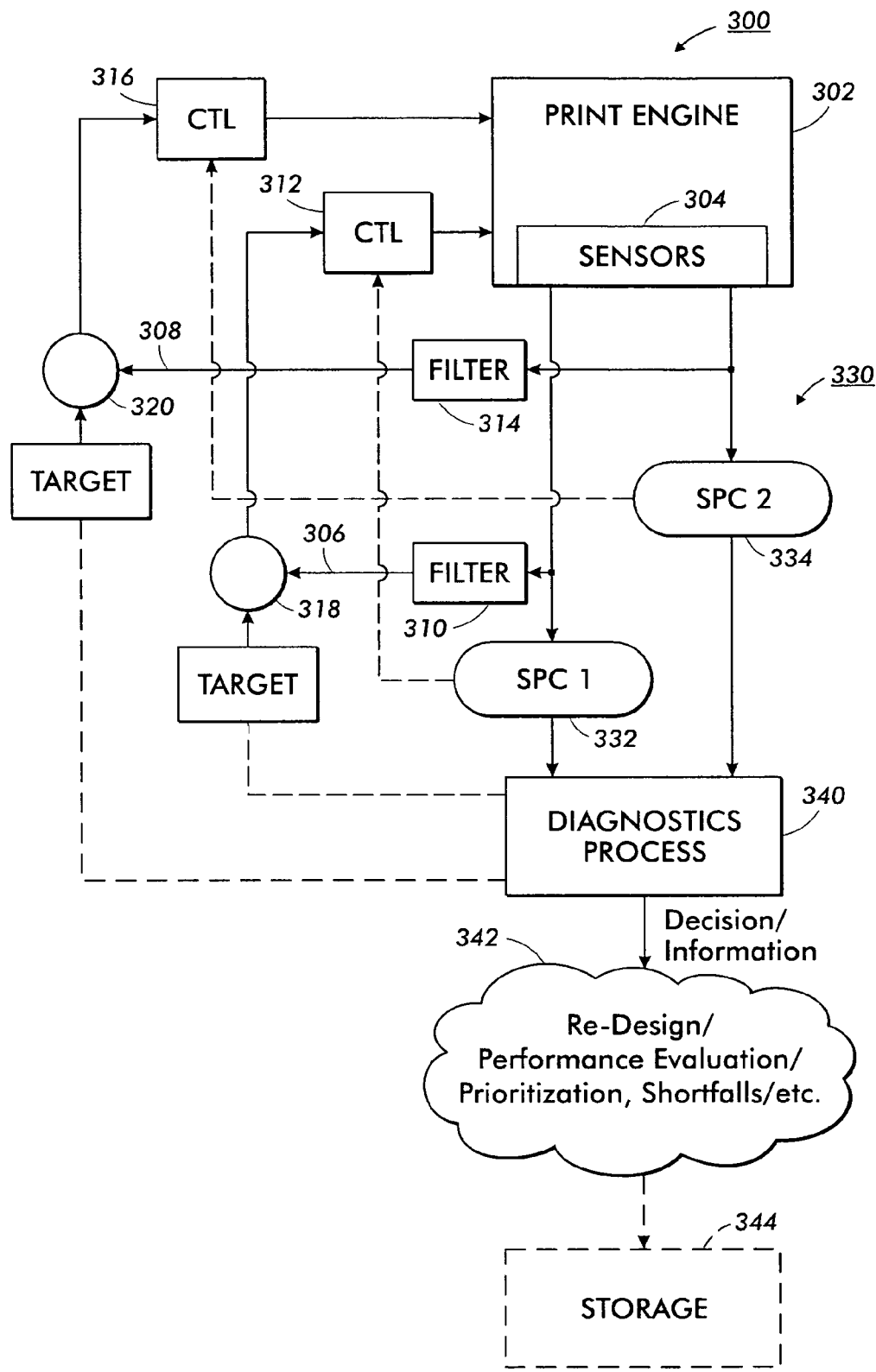
FIG. 4 is a block diagram of an implementation of the present exemplary embodiment.

As shown in FIG. 4, a print engine system 300 includes a print engine 302 having sensors 304 disposed therein. The print engine comprises a feedback loop having paths 306 and 308 which extend from the sensors 304 back to the print engine 302. Of course, feedback loops associated with print engines are well known and may accomplish different objectives. In one example, the feedback loop is used to feed back data read by color sensors to the print engine. Electrostatic fields within the print engine may be changed as a result. This, of course, will impact the subsequently printed pages. The path 306 includes a filter 310 and a control unit 312. Likewise, the path 308 includes a filter 314 and a control unit 316. Also included within the paths 306 and 308 are comparison units 318 and 320, respectively. It should be understood that the control unit, comparison unit and filter of each feedback path establish the control mechanism for that path and, in one form, may comprise a single unit in implementation.

The system 300 is further provided with a statistical process control section 330 that includes statistical process control unit 332 and statistical process control unit 334. These units 332 and 334 are connected at their input side to the paths 306 and 308, respectively. The output of each of these units is connected to a diagnostics process center 340 whose output of a decision or information is input to an action element 342 for the design and/or service community. The actions taken may vary. For example, a redesign, performance evaluation, or the like may be implemented. The information or decision may be stored in a storage module 344 as a part of, prior to, or subsequent to the action taken. Of course, the information or decision may also be ignored by the system or the designer/operator.

In operation, the output of the sensors 304 of the print engine 302 are processed by two types of filters, depending on the location of the signal as it is passed to the realtime feedback loop 306, 308 and/or the diagnostic decision making process 330. For example, the filters 310, 314 may be simple low pass filters to remove random electrical noise that behaves as if drawn from a fixed probability distribution. Such noise does not result in errant reads, or "spikes," as contemplated herein. The input signals labeled as targets can be either fixed or can be outputs of other decision making modules. They are determined by a customer, for example, or set by the diagnostic process block 340.

As shown, the sensor outputs are also directed to the SPC blocks 332, 334. It is within these blocks that statistical information is extracted and the process characterized in terms of stability, location, and dispersion, as described in connection with FIGS. 1 and 2. Notably, a comparison is made, as noted in FIG. 2 (at 208) above, between a selected range and the control limits. If the selected range exceeds the process limits, this is communicated to the control units 312 and/or 316 (and/or other appropriate elements) which operate to "ignore" that data for feedback purposes (this communication being represented by the dashed lines between the SPC units and the control units). It should be understood, however, that the detailed design of each SPC processing filter will depend on the specific application, particularly if there are known special kinds of process deviations that are feared. The outputs of these modules are then fed to the diagnostics block 340 for further processing. For example, the diagnostics block may also feed data to other places as noted above.

It should be appreciated that the components of the system 300, with the exception of the print engine 302, are preferably included on a multi-input/output processor (MIOP) board within the printer. Of course, it will be understood that the process capability and functionality of the system described is actually implemented by the hardware identified and suitable software that is distributed throughout the system described. For example, the print engine will typically run the software that relates to printing and adjusting while the diagnostics process unit and the statistical process control units will provide the software functionality for the statistical process control features described herein.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A method of statistical process control for a print engine to address errant sensor data, the method comprising:
receiving sensor data read by process control sensors in the print engine, the sensor data also being transmitted on a feedback path for controlling the print engine;
identifying subgroups within the sensor data;
determining ranges of each of the subgroups;
calculating an average range based on the determined ranges;
estimating a natural process variation based on the average range;
calculating a control limit based on the natural process variation;

comparing a selected subgroup range to the control limit;
identifying the sensor data that exceeds the control limit as errant sensor data; and,
filtering out the errant sensor data from the feedback path.

2. The method as set forth in claim 1 wherein the process control sensors detect color.

3. The method as set forth in claim 1 wherein the controlling of the print engine comprises initiating color shifts.

4. The method as set forth in claim 1 wherein the identifying of subgroups comprises identifying subgroups of a specified number of data points.

5. The method as set forth in claim 1 wherein the estimating of the natural process variation comprises estimating a standard deviation.

6. The method as set forth in claim 5 wherein calculating the control limit comprises multiplying the standard deviation by a factor of approximately three.

7. The method as set forth in claim 1 wherein the filtering out of errant sensor data comprises selectively activating a control unit on the feedback path to block the errant data from feedback to the print engine.

8. The method as set forth in claim 1 further comprising storing the errant sensor data.

9. The method as set forth in claim 1 further comprising performing a diagnostics process based on the errant sensor data.

10. The method as set forth in claim 1 further comprising performing a redesign of the print engine based on the errant sensor data, system stability, and estimated mean and standard deviation behavior.

11. A system of statistical process control for a print engine, the system comprising:
means for receiving sensor data read by process control sensors in the print engine, the sensor data also being transmitted on a feedback path for controlling the print engine;
means for identifying subgroups within the sensor data;
means for determining ranges of each of the subgroups;
means for calculating an average range based on the determined ranges;
means for estimating a natural process variation based on the average range;
means for calculating a control limit based on the natural process variation;
means for comparing a selected subgroup range to the control limit;
means for identifying the sensor data that exceeds the control limit as errant sensor data; and,
means for filtering out the errant sensor data from the feedback path.

12. The system as set forth in claim 1 wherein the process control sensors are operative to detect color.

13. The system as set forth in claim 1 wherein the controlling of the print engine comprises initiating color shifts.

14. The system as set forth in claim 11 wherein the subgroups comprise a specified number of data points.

15. The system as set forth in claim 11 wherein the natural process variation comprises a standard deviation.

16. The system as set forth in claim 15 wherein the control limit comprises a value that is approximately three times the standard deviation.

17. The system as set forth in claim 11 wherein the means for filtering out the errant sensor data comprises means for selectively activating a control unit on the feedback path to block the errant sensor data from feedback to the print engine.

18. The system as set forth in claim 11 further comprising a means for storing the errant sensor data.

19. The system as set forth in claim 11 further comprising a means for performing a diagnostics process based on the errant sensor data.

* * * * *